Patented Sept. 29, 1953

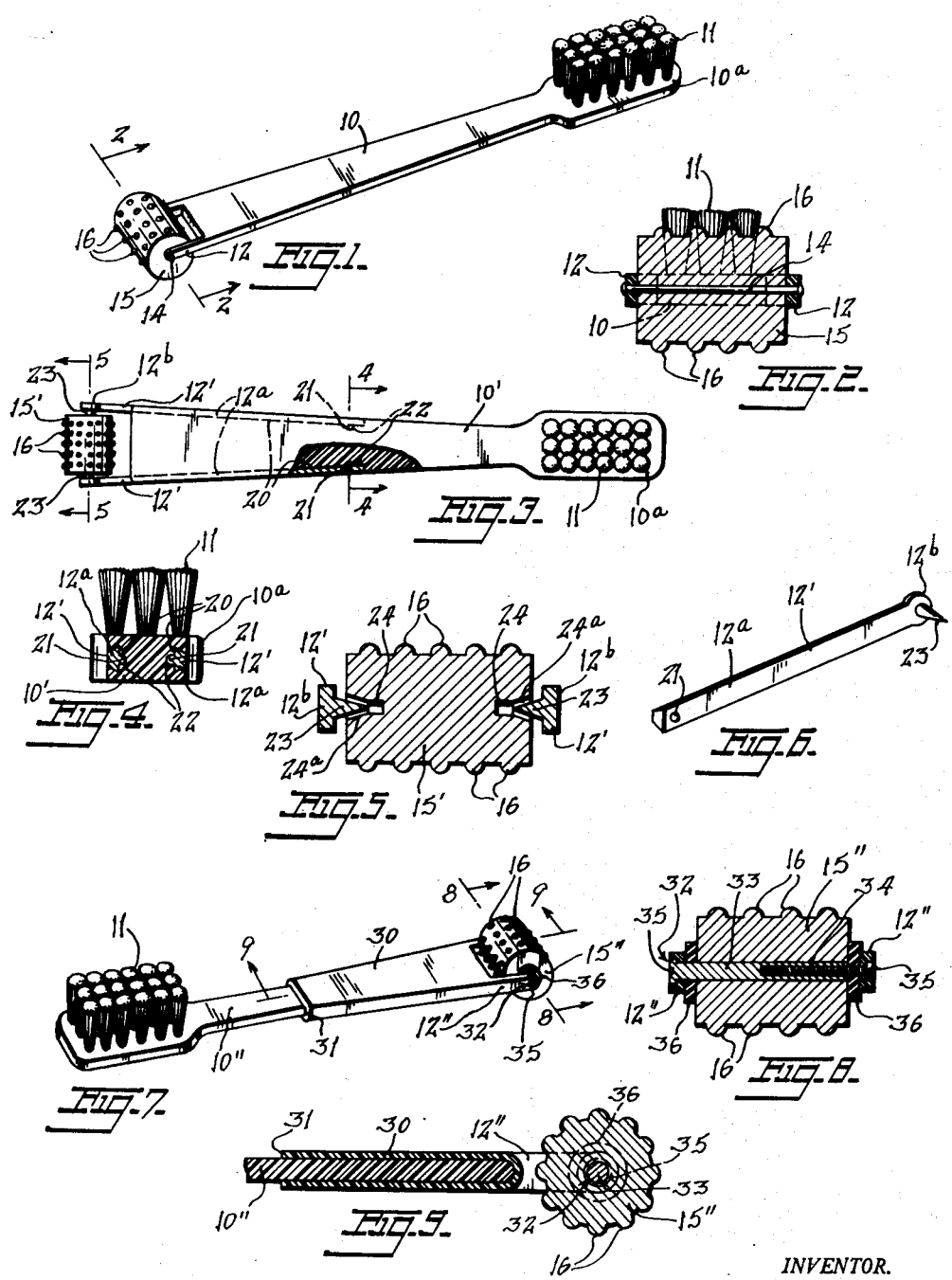

2,653,598

UNITED STATES PATENT OFFICE 2,653,598

COMBINED TOOTHBRUSH AND GUM MASSAGER

Vincent Torino, Brooklyn, N. Y.

Application May 16, 1951, Serial No. 226,680

5 Claims. (Cl. 128—57)

This invention relates to new and useful improvements in combined toothbrush and gum massagers.

More specifically, the present invention proposes the construction of combined toothbrush and gum massagers embodying a single handle having tufts of bristles mounted on one end thereof and a roughened massaging drum rotatively mounted at the other end of the handle in a manner so that one end of the handle can first be used to brush the teeth after which the handle can be turned end for end so that the drum can be used for massaging and exercising the gums providing for complete and thorough oral hygiene.

Another object of the present invention proposes the provision of spaced arms extended from the other end of the handle and between which the massaging drum is rotatively supported by means of a shaft extended between the arms in a manner so that the massaging drum is an integral unit with the handle.

Still another object of the present invention proposes slidably fitting the inner ends of the spaced arms into complementary grooves formed in the side of the handle and providing the inner faces of the outer ends of the spaced arms with inwardly extended trunnions to be received into complementary sockets formed in the ends of the massaging drum in a manner to permit complete disassembly of the massager parts and facilitate cleaning of those parts.

The present invention further proposes the provision of conical trunnions on the inner faces of the outer ends of the arms for engagement into complementary frusto-conical portions in the sockets in the ends of the massaging drum in a manner so that pressure on the side arms will cause the surfaces of the conical trunnions to bear frictionally against the surfaces of the drum defining the frusto-conical socket portions in a manner to resist free rotation of the drum and so vary the pressure required against the gums to cause the roughened massaging drum to roll over the surfaces of the gums.

Still another object of the present invention proposes forming the spaced arms integrally with a tubular sleeve which is open at its end remote from the massaging drum in a manner to be slipped into position over the free end of a conventional toothbrush.

A further object of the present invention proposes positioning friction washers between the adjacent faces of the ends of the massaging drum and the spaced arms with adjustable means for adjusting the frictional contact between the contacting surfaces of the drum, the washers and the arms so as to resist free rotation of the drum and so increase the pressure required against the gums to cause the drum to roll over the gums.

It is a further object of the present invention to construct combined toothbrushes and gum massagers which are simple and durable, which are effective to provide complete oral hygiene and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a combined toothbrush and gum massager constructed in accordance with the present invention.

Fig. 2 is an enlarged transverse sectional view taken on the line 2—2 of Fig. 1.

Fig. 3 is an elevational view of a combined toothbrush and gum massager constructed in accordance with a modification of the present invention, with a portion thereof broken away to reveal interior construction.

Fig. 4 is an enlarged transverse sectional view taken on the line 4—4 of Fig. 3.

Fig. 5 is an enlarged transverse sectional view taken on the line 5—5 of Fig. 3.

Fig. 6 is a perspective view of one of the side arms, per se, used in the form of the invention shown in Figs. 3 to 5.

Fig. 7 is a perspective view of a combined toothbrush and gum massager constructed in accordance with a still further modification of the present invention.

Fig. 8 is an enlarged transverse sectional view taken on the line 8—8 of Fig. 7.

Fig. 9 is an enlarged partial longitudinal sectional view taken on the line 9—9 of Fig. 7.

The combined toothbrush and gum massager, according to the first form of the present invention shown in Figs. 1 and 2, includes an elongated handle 10. The handle 10 is formed of any of the synthetic resin materials (thermosetting or thermoplastic) and has at one end an enlarged head portion 10ª. A plurality of tufts of bristles 11 are mounted on one side of the enlarged head 10ª forming the brush for cleaning the teeth as is generally known in the art to which the present invention pertains.

Extending longitudinally from the other end of the handle 10 there is a spaced pair of arms 12 which are integral with the handle 10. Extended between the spaced arms 12, there is a shaft 14 of any desired rust resistant metal.

Rotatively supported on the shaft 14 between the arms 12, there is a drum 15 which has its surface roughened by a plurality of small rounded projections 16. The drum 15 together with the projections 16 is molded of hard rubber, metal or other material, but is preferably made of a synthetic resin material.

The drum 15 is free to rotate on the shaft 14 and after the teeth have been cleaned using the bristles 11, the handle 10 is turned end for end so that the massaging drum 15 can be inserted into the mouth to be rolled over the gums to massage and exercise the gums. Thus, the present invention combines in a single instrument both a toothbrush and a massager required for complete and thorough oral hygiene.

In the modification of the invention shown in Figs. 3 to 6, the arms 12' are formed of separate flexible rust resistant metal and have dovetailed inner end portions 12a. The dovetailed inner end portions 12a of the arms 12' are slidably extended into the ends of complementary dovetailed grooves 20 formed in the sides of the handle 10'. The inner faces of the inner end portions 12a of the arms 12' are formed with inwardly extended nibs 21 received within complementary recesses 22 formed in the handle 10' for releasably holding the dovetailed inner end portions 12a of the arms 12' in position in the grooves 20. When the arms 12' are pulled out of the open ends of the grooves 20, the nibs 21 ride out of the recesses 22 and move along the inner faces of the grooves.

The arms 12' have enlarged rounded outer end portions 12b which are provided on their inner faces with end aligned inwardly extended conical trunnions 23. The trunnions 23 are extended into complementary sockets 24 formed in the ends of the massaging drum 15'. The sockets 24 have complementary frusto-conical outer portions 24a, see particularly Fig. 5, which have walls extended parallel to the walls of the conical trunnions 23. The sockets 24 are deeper than the trunnions 23 are long so that the pointed ends of the trunnions can never reach the walls of of the drum 15' defining the inner ends of the sockets 24.

With the article assembled as shown in Fig. 3, it is possible to control the rotation of the massaging drum 15' to vary the pressure required against the gums to cause the drum to rotate over the gums and so vary the massaging pressure applied to the gums. This is effected by manually squeezing the outer end portions 12b of the arms 12' together the desired degree causing the frictional contact between the surfaces of the conical trunnions 23 and the walls of the outer frusto-conical portions 24a of the sockets 24 to be increased to resist free rotation of the drum.

The construction of the modification of the invention shown in Figs. 3 to 6 is further characterized by the fact that the dovetailed inner end portions 12a of the arms 12' can be pulled completely out of the grooves so that the arms can be separated from the massaging drum 15' so that all of the parts can be separately cleaned and rinsed to maintain them in a clean state.

In all other respects, the form of the invention shown in Figs. 3 to 6 is similar to that described in connection with Figs. 1 and 2 and like reference numerals identify like parts in all of the views.

The modification of the invention shown in Figs. 7 to 9 is characterized by the fact that the arms 12'' which rotatively support the massaging drum 15'' are formed integrally with a tubular sleeve 30. The sleeve 30 and the arms 12'' are integrally molded of one of the synthetic resin materials and the sleeve 30 is open at its end 31 remote from the massaging drum 15''. The open end 31 of the sleeve 30 permits the sleeve to be slipped into position upon the free end of the handle 10'' of a conventional toothbrush having the usual head 10a and tufts of bristles 11.

The massaging drum 15'' is removably rotatively mounted in position between the adjacent faces of the arms 12'' by means of a two-part shaft 32. The shaft 32 consists of an outer part 33 and an inner part 34 screw threaded into the adjacent end of the outer part 33. The outer ends of the parts 33 and 34 are formed with enlarged heads 35 set into recesses formed in the outer faces of the side arms to be flush as shown in Fig. 8. The heads 35 have the usual slots for engagement by screw drivers or the like for tightening the parts together.

Friction washers 36 of rubber or the like material, are positioned upon the two-part shaft 32 between the adjacent faces of the ends of the drum 15'' and the arms 12'' so as to resist free rotation of the drum 15'' on the shaft 32. Tightening the parts 33 and 34 of the shaft 32 will increase the effect of the friction washers 36 and increase the pressure against the gums required to cause the drum to roll over the gums and so permit the massaging pressure to be varied as desired.

The form of the invention shown in Figs. 7 to 9 is also similar, in all other respects, to the form of the invention shown in Figs. 1 and 2 and like parts are identified by the same reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A gum massager, comprising an elongated handle, spaced arms extended longitudinally from one end of said handle, and a massaging drum rotatively supported between said arms, said arms being made of flexible material and having dovetailed inner end portions, said handle having dovetailed grooves in the sides thereof opening to the said other end of said handle and into which said dovetailed inner end portions of said handle are slidably engaged, and means retaining said dovetailed inner end portions in position in said grooves.

2. A gum massager, comprising an elongated handle, spaced arms extended longitudinally from one end of said handle, and a massaging drum rotatively supported between said arms, said arms being made of flexible material and having dovetailed inner end portions, said handle having dovetailed grooves in the sides thereof opening to the said other end of said handle and into which said dovetailed inner end portions of said handle are slidably engaged, and means retaining said dovetailed inner end portions in position in said grooves, said retaining means comprising nibs on the inner faces of said dovetailed inner end portions, said handle having recesses in its walls defining said grooves into which said nibs are extended.

3. A gum massager, comprising an elongated handle, spaced arms extended longitudinally from one end of said handle, and a massaging drum rotatively supported between said arms, said arms being made of flexible material and having dovetailed inner end portions, said handle having dovetailed grooves in the sides thereof opening to the said other end of said handle and into which said dovetailed inner end portions of said handle are slidably engaged, and means retaining said dovetailed inner end portions in position in said grooves, said arms having enlarged outer end portions between which said drum is positioned, and means rotatively supporting said drum between said outer end portions of said flexible arms.

4. A gum massager, comprising an elongated handle, spaced arms extended longitudinally from one end of said handle, and a massaging drum rotatively supported between said arms, said arms being made of flexible material and having dovetailed inner end portions, said handle having dovetailed grooves in the sides thereof opening to the said other end of said handle and into which said dovetailed inner end portions of said handle are slidably engaged, and means retaining said dovetailed inner end portions in position in said grooves, said arms having enlarged outer end portions between which said drum is positioned, and means rotatively supporting said drum between said outer end portions of said flexible arms, said drum supporting means comprising inwardly extended end aligned conical trunnions formed on the inner faces of said enlarged outer end portions, said drum having sockets in the ends thereof into which said trunnions extend, said sockets having frusto-conical outer end portions matching said conical trunnions.

5. In a gum massager, the combination which comprises an elongated handle having spaced arms extended longitudinally from one end, and a roller having spaced small rounded projections extended from the surface positioned between said arms, said roller having centrally positioned conical-shaped recesses in the ends, and said arms having conical-shaped projections extended into the similarly shaped recesses of the roller.

VINCENT TORINO.

References Cited in the file of this patent

UNITED STATES PATENTS

| Number | Name | Date |
|---|---|---|
| 2,193,249 | Flanders et al. | Mar. 12, 1940 |

FOREIGN PATENTS

| Number | Country | Date |
|---|---|---|
| 167,205 | Great Britain | Aug. 11, 1921 |
| 586,675 | Great Britain | Mar. 27, 1947 |
| 597,427 | Great Britain | Jan. 26, 1948 |